Patented June 20, 1939

2,163,284

UNITED STATES PATENT OFFICE 2,163,284

ALKYL CYCLOHEXANONES AND PROCESS FOR PRODUCING SAME

Wilbur A. Lazier, Wyckwood, Del., assignor to E. I. du Pont de Nemours & Company, Wilmington, Del., a corporation of Delaware No Drawing. Application December 22, 1937, Serial No. 181,203

13 Claims. (Cl. 260—586)

This invention relates to catalytic dehydrogenation processes and more particularly to processes for the dehydrogenation of certain alkyl substituted cyclic secondary alcohols to the corresponding ketones. Specifically, the invention relates to processes for the catalytic dehydrogenation over copper chromite catalysts of side chain cyclic secondary alcohols resulting from the nuclear saturation of alkyl substituted monohydric phenols.

This application is a continuation-in-part of my co-pending application, Serial No. 713,922, filed March 3, 1934.

The catalytic dehydrogenation of simple oxygenated organic compounds such as primary aliphatic alcohols has been practised for many years in the preparation of aldehydes, ketones, and esters. The vapor phase method developed by Sabatier and his co-workers is the procedure usually used, but unfortunately this method is not always suitable for use with compounds of high molecular weight or any other types that are volatilized only with difficulty.

In my copending application, to which reference has been made above, I have disclosed a satisfactory dehydrogenation process whereby the limitations of the older methods are overcome through the use of highly active chromites suspended in a liquid pool of the hydroxylated compound undergoing dehydrogenation at temperatures that may range from 100° C. to 230° C. I have now found according to the present invention that the hydrogenated alkyl phenols can be dehydrogenated smoothly to the corresponding alkyl-substituted cyclic ketones by heating them in the liquid phase in the presence of highly active dehydrogenation catalysts such as powdered copper chromite. Hydrogen is evolved with great rapidity with stirring at temperatures in the range 100–230° C. The process takes place with a minimum of uncontrolled decomposition and high yields of the corresponding ketones are obtained.

This invention therefore has as an object the conversion of saturated side chain cyclic secondary alcohols derived by hydrogenation from alkyl-substituted monohydric phenols into the corresponding ketones. A further object is the dehydrogenation of the hydrogenated side chain phenols so as to obtain high yields of ketones. Another object is the production of new and useful ketones. Other objects will appear hereinafter.

These objects are accomplished by bringing a hydrogenated alkyl side chain phenol with at least four carbon atoms in said alkyl side chain into contact in the liquid phase with a dehydrogenating catalyst preferably a chromite catalyst at a temperature within the range of 50° C. to 400° C.

The preferred embodiments of this invention are given in detail in the following selected examples:

Example I

Fifteen hundred grams of copper nitrate dissolved in 4 liters of water was mixed with a solution containing 1000 grams of ammonium chromate in an equal volume of water. Ammonium hydroxide was added to neutralize the acidity developed during precipitation of the copper ammonium chromate. The precipitate was filtered, dried, and ignited at a temperature of 400° C. after which it was extracted twice with dilute acetic acid. The resulting copper chromite powder was employed for dehydrogenation without further treatment.

Two hundred and fifty grams of methyl cyclohexanol and 25 grams of copper chromite, prepared as described, were mixed together and boiled for 30 hours under a reflux condenser at substantially atmospheric pressure and a temperature of 167°–170° C. Thirty-four liters of hydrogen was evolved from which it was computed that 63% of the methyl cyclohexanol had been converted to the corresponding methyl cyclohexanone.

Example II

One hundred fifty grams of 3,5-dimethyl cyclohexanol is heated with 15 g. of copper chromite catalyst similar to that described in Example I at atmospheric pressure and at temperatures ranging from 160° C. to a maximum determined by the boiling point of the mixture (approximately 180–187 C.). At the end of 13 hours the rate of hydrogen evolution is greatly diminished and the amount corresponds to 64% of the theoretical for conversion to the ketone. The product is dissolved in acetone, filtered to remove the catalyst and the solvent evaporated. The residue is heated from one to five hours at 135–140° C. with slightly more than the theoretical amount of phthalic anhydride, as determined by the hydroxyl number, and is finally distilled. Eighty grams of pure 3,5-dimethyl cyclohexanone, boiling point 65–66° C./16 mm., is obtained. This reaction may be carried out at higher temperatures in a pressure autoclave equipped for drawing off the hydrogen gas.

Example III

One hundred grams of tertiary amyl cyclohexanol-4 is heated with 10 g. of copper chromite catalyst prepared as in Example I at atmospheric pressure and temperatures ranging from 180–230° C. Ninety-five per cent of the theoretical amount of hydrogen is evolved in 3.5 hours. The product is dissolved in acetone, filtered to remove the catalyst, the solvent evaporated and the residue distilled. Forty-five grams of soft, tacky resin is left in the flask. The distillate, boiling point 124–127° C./16 mm., is heated from one to five hours with 25 g. of phthalic anhydride at 140° C. and redistilled. This product is washed with dilute alkali and again fractionated. Forty-one grams of tertiary amyl cyclohexanone-4, boiling point 124–125° C./16 mm. is obtained. Tertiary butyl cyclohexanol-4 may be substituted for the amyl compound with similar results.

Example IV

Heptyl cyclohexanol (di-isopropyl carbinyl cyclohexanol) is dehydrogenated by a process identical with that described in Example III. The products are di-isopropyl carbinyl cyclohexanone, boiling point 158–160° C./25 mm. (25%), and a soft, sticky resin (50%).

Although in the above examples certain definite conditions of temperature, pressure, amounts of materials, durations of reactions, etc. have been indicated, it is to be understood that these values may be varied somewhat within the scope of the invention since the particular conditions of operation are governed by the materials selected for treatment and the type of catalyst employed. The processes described in this invention are operative within the temperature range from 50° C. to 400° C. and in a pressure range from below atmospheric pressure to a maximum necessary to overcome the vapor pressure of a given material under treatment. I prefer to operate at a temperature within the range of 100° C. to 230° C. In general, it will seldom be necessary to use pressures higher than atmospheric because of the relatively high boiling points of all substances that come within the scope of this invention. Pressures above 35 atmospheres tend to reverse the reaction. In its broadest aspects, this invention contemplates the employment of liquid phase dehydrogenation catalysts which effect the liberation of hydrogen from secondary carbinol groups in preference to dehydration. The catalysts employed in the practice of this invention are compounds of the elements of Group 1, Subgroup B, and Group II, Subgroup B, in the Periodic table. Copper-containing catalysts such as powdered copper, powdered copper bronze, copper oxide, copper carbonate, or copper chromite are preferred in the practice of this invention. Catalyst compositions such as those containing silver, cadmium, zinc, etc., and combinations thereof or their oxides are suitable, but are somewhat less desirable.

The catalysts of this invention are most effective in a finely divided state and numerous methods are available for their preparation. Powdered dehydrogenating metals may be prepared by electrodeposition, precipitation from solution by replacement and by reducing agents or by reduction of suitable compounds such as the oxides, hydroxides, or carbonates with hydrogen. Oxides are formed by direct combination of the metals with oxygen or by thermal decomposition of hydroxides, carbonates and the like. Normal and basic carbonates of dehydrogenating metals are precipitated from salt solutions by alkali metal or other soluble carbonates. The preparation of a typical chromite catalyst is outlined in Example I, and a more extended description of these catalysts is given in U. S. Patent 1,746,782, issued on February 11, 1930, U. S. Patent 1,964,000 issued June 26, 1934, and in copending application Serial No. 713,922, filed March 3, 1934. Catalysts supported on materials, such as kieselguhr, which exert a dehydrating effect are markedly inferior to unsupported catalysts.

It is apparent that the processes of this invention offer many advantages over the prior art. Most of the compounds which have been studied cannot be subjected to a vapor phase process because of their low volatilities and tendency to dehydrate and otherwise decompose at the high temperatures required in vapor phase reactions. My investigation has resulted in the discovery of a novel and highly efficient process which is applicable to the dehydrogenation of sensitive and non-volatile compounds as well as those more stable and volatile. The very active and efficient catalysts disclosed are particularly suitable for the dehydrogenation of compounds in the liquid phase at comparatively low temperatures. The low temperature allows a long period of contact between the catalyst and compound and keeps degradation and side reactions at a minimum. Furthermore, a large variety of old and new products may be prepared which would otherwise be obtainable only through laborious and costly processes.

The processes of this invention are applicable to the dehydrogenation of compounds represented by the type formula R—X—OH wherein R stands for any alkyl side chain group and X stands for the cyclohexane (hexahydrophenyl) ring. Examples of compounds whose structures fall within this type formula and their ketonic products are shown by the following structural formulas:

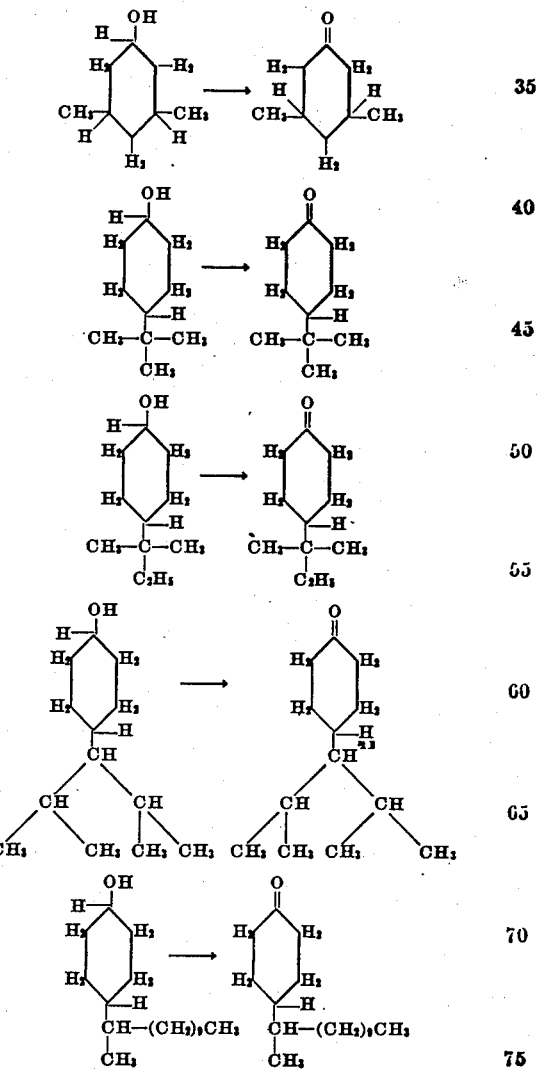

The cyclic alcohols are readily available through the hydrogenation of the corresponding phenols which in turn may be prepared by reacting the appropriate alcohols or olefins with phenol. It is not necessary that the alkyl side chain be in any particular position with respect to the hydroxyl, but 1 and 3 substituents are the most frequently encountered. The length of the alkyl side chain (which may be continuous or branched) may vary from one to eighteen carbon atoms. Preferably the invention is practiced on compounds having at least four and not more than twelve carbon atoms in the side chain.

3,5-Dimethyl cyclohexanone has been prepared by methods other than those described above, but with inferior results. The ketones having the larger side chains are new to the art and may find application in industrial fields such as plasticizers, resin ingredients and sources for new oxidation products.

Since many widely different embodiments of this invention may be made without departing from the spirit and scope thereof, it is understood that it is not limited to the specific embodiments thereof except as defined in the appended claims.

I claim:

1. The process for catalytically dehydrogenating hydrogenated alkyl side chain phenols, wherein the said alkyl side chain contains at least four carbon atoms, which comprises bringing into contact in the liquid phase a hydrogenated alkyl side chain phenol and a dehydrogenating catalyst at a temperature within the range of 50° C. to 400° C.

2. The process in accordance with claim 1 characterized in that the reaction is carried out at temperatures within the range of 100° C. to 230° C.

3. The process for catalytically dehydrogenating hydrogenated alkyl side chain phenols, which comprises bringing into contact in the liquid phase a hydrogenated alkyl side chain phenol and a dehydrogenating catalyst at a temperature within the range of 100° C. to 230° C. and a pressure not exceeding 35 atmospheres.

4. The process for catalytically dehydrogenating an alkyl cyclic secondary alcohol derived from a side chain alkyl substituted phenol by hydrogenation, said side chain having at least four carbon atoms, which comprises bringing into contact in the liquid phase said alkyl cyclic secondary alcohol with a dehydrogenating catalyst at a temperature within the range of 50° to 400° C.

5. The process in accordance with claim 4 characterized in that the reaction is carried out at a temperature within the range of 100° to 230° C. and at a pressure not exceeding 35 atmospheres.

6. The process for catalytically dehydrogenating a compound of the type R—X—OH, wherein R stands for any alkyl side chain group having from four to eighteen carbon atoms and X stands for the cyclohexane (hexahydrophenyl) ring, which comprises bringing into contact in the liquid phase said compound R—X—OH and a dehydrogenating catalyst at a temperature within the range of 100° to 230° C.

7. The process in accordance with claim 6 characterized in that R stands for a branched-chain alkyl group having from four to twelve carbon atoms.

8. The process in accordance with claim 6 characterized in that the catalyst is a dehydrogenating chromite catalyst.

9. The process in accordance with claim 6 characterized in that the catalyst is a dehydrogenating, predominantly copper-containing catalyst.

10. The process in accordance with claim 6 characterized in that the dehydrogenating catalyst comprises essentially copper chromite.

11. The process in accordance with claim 6 characterized in that R stands for a branched-chain alkyl group having from four to twelve carbon atoms and the dehydrogenating catalyst comprises essentially copper chromite.

12. As a new composition of matter a ketone having the structure

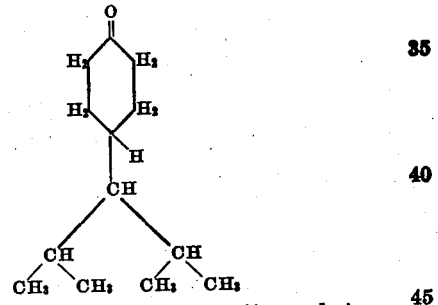

13. As a new composition of matter a ketone having the structure

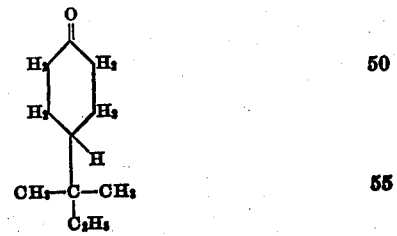

WILBUR A. LAZIER.